July 31, 1956 W. W. HANSEN ET AL 2,757,312
TUNING MEANS FOR CAVITY RESONATOR DEVICES
Original Filed Jan. 17, 1938
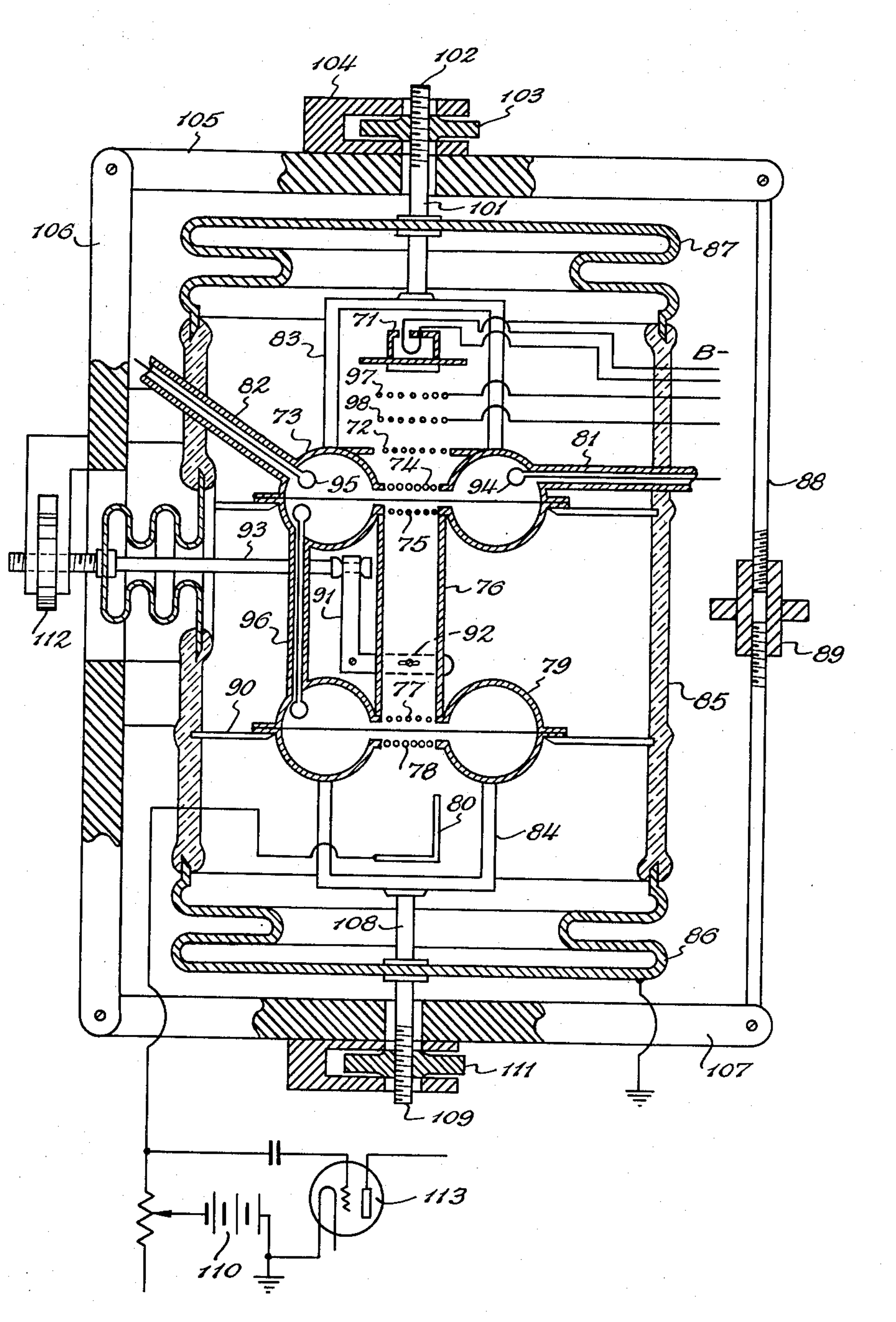
INVENTORS
WILLIAM W. HANSEN, DECEASED
by OLIVE D. ROSS, EXECUTRIX
and RUSSELL H. VARIAN
BY Paul B. Hunter
ATTORNEY United States Patent Office 2,757,312

Patented July 31, 1956

2,757,312

TUNING MEANS FOR CAVITY RESONATOR DEVICES

William W. Hansen, deceased, late of Stanford University, Calif., by Olive D. Ross, executrix, Palo Alto, Calif., and Russell H. Varian, Stanford, Calif., assignors to The Board of Trustees of the Leland Stanford Junior University, Stanford University, Calif., a corporation of California Original application January 17, 1938, Serial No. 185,382, now Patent No. 2,415,094, dated February 4, 1947. Divided and application September 23, 1947, Serial No. 775,648, now Patent No. 2,616,038, dated October 28, 1952, which is a division of application Serial No. 459,040, September 19, 1942. Again divided and this application December 13, 1951, Serial No. 261,518

7 Claims. (Cl. 315—6)

The present application is a division of application Serial No. 775,648, now Patent 2,616,038, for Frequency Converter filed September 23, 1947 as a division of application Serial No. 459,040, now abandoned, filed September 19, 1942 for High Frequency Electron Discharge Tube Apparatus, which, in turn, was a division of Patent No. 2,415,094 for Radio Measurement of Distances and Velocities, granted February 4, 1947 on an application filed January 17, 1938.

In the above patent there is disclosed a system for locating aircraft or other distant objects and for measuring the distances and velocities of such objects by radio means. The present invention is concerned with apparatus adapted to operate at ultra-high frequencies and useful in the system described and claimed in the above parent application as well as in many other types of systems.

An object of the present invention is to provide novel tuning apparatus for cavity resonator devices.

Another object of the present invention is to provide novel tuning means for cavity resonator devices employing a plurality of resonators, which tuning means is adapted for differentially tuning the said resonators.

Still another object of the present invention is to provide tuning means for cavity resonator devices adapted for simultaneously tuning a plurality of resonators.

A still further object of the present invention is to provide novel tuning means adapted for individual tuning resonators of resonator devices, for simultaneously tuning resonators and for differentially tuning resonators.

Other objects and advantages of the present invention will become apparent from a consideration of the following specification and drawings, in which The single figure is a diagrammatic cross-sectional representation of an improved ultra-high-frequency apparatus useful for receiving, amplifying, detecting and otherwise modifying alternating currents of ultra-high-frequency.

Referring to the drawing, the single figure shows a receiving arrangement useful in the apparatus disclosed in the above-mentioned parent Patent No. 2,415,094 or in other arrangements. Here an electron emitter 71 is provided cooperating with a collimating grid 72 fixed to an electron-grouping resonator 73 having grids 74 and 75 forming an electron permeable gap.

A second and energy-absorbing resonator 79 is provided, having grids 77 and 78 forming an electron permeable gap, and mechanically joined to resonator 73 by means of a tube 76. A detector electrode 80, to be described, is located in the path of the electron beam issuing from the grid 78 of resonator 79. An incoming signal may be fed to the apparatus of the invention by means of a concentric line 81 which delivers energy to resonator 73 by means of a coupling loop 94. Energy of a heterodyning frequency may be also led to resonator 73 by means of a concentric line 82 which delivers energy to a coupling loop 95 located within resonator 73.

Resonators 73 and 79 are electrically coupled by means of a coupling line 96. Interposed between emitter 71 and collimating grid 72 is a grid 97 for controlling the electron stream, which may be connected to an oscillator as described in the above-mentioned parent patent, or to any other source of control potential. A further electron-controlling grid 98 may also be provided, to which may be connected a further oscillator as also described in the above-mentioned parent patent. If desired, both oscillators may be connected to one of these grids, such as 97.

For tuning or adjusting the resonant frequency of the apparatus, one flexible wall of resonator 73 is connected by a mechanical connection 83 to a member 101 which passes through the wall of the evacuated container 85 by means of a bellows arrangement 87 permitting motion of member 101, which terminates in a screw thread 102, about which is threaded a nut 103. Nut 103 is prevented from moving longitudinally with respect to the apparatus by a bracket 104 to which is fixed an arm 105. Pivotally linked to arm 105 are further arms 88 and 106 which in turn are pivotally connected to an arm 107 cooperating with resonator 79 in the same manner as arm 105 cooperates with resonator 73. Thus, fixed to a flexible wall portion of resonator 79 is a bracket 84 fastened to a member 108 similar to member 101, having a screw thread 109 thereon cooperating with a nut 111 prevented from longitudinal motion with respect to arm 107.

Tube 76 supplies mechanical support between the resonators 73 and 79 so that rotation of nut 111, for example, will cause a compression of the flexible wall portions of resonators 79, thereby producing a tuning adjustment of this resonator, as described in Varian Patent No. 2,242,275, issued May 20, 1941 and reissued April 8, 1952 as Re. 23,479. Similarly, rotation of nut 103 will produce a tuning of resonator 73.

Simultaneous tuning of both resonators 73 and 79 may be produced by means of a turn-buckle arrangement 89 which, by means of the pivoted arms already described, will simultaneously adjust resonators 73 and 79.

For producing a differential tuning of the two resonators, tube 76 is provided with a slot in which slides a pin 92 fixed to a lever 91, which is actuated externally by means of an arm 93 and a thread and nut arrangement 112 similar to those already described. In this manner, by rotation of the nut of arrangement 112, tube 76 is translated up or down and thereby increases the resonant frequency of one of the resonators 73, 79, while decreasing that of the other.

The operation of the receiver shown in the single figure is somewhat similar to that of a vacuum tube circuit with two tuned circuits. The two resonators are tuned to about the same frequency. An input signal to which resonator 73 is tuned is introduced through the line 81 to the coupling loop 94. This causes the resonator 73 to contain a weak electromagnetic field which acts upon the stream of electrons from the emitter 71 as they proceed through the resonator from grid 74 to grid 75 after being accelerated by the field between the emitter 71 and collimating grid 72 produced by a battery such as 45 in Fig.

1 of the aforementioned Patent 2,616,038. In addition to the incoming signal at 94, the resonator 73 receives a signal through loop 95 of nearly the same frequency for heterodyning with the input signal. This heterodyning signal combines with the input signal to establish the oscillating electromagnetic field in member 73 that acts on the electron stream to cause the same to become bunched, as described in the aforementioned Varian Patent No. 2,242,275 now Re. 23,479, as it travels toward the grids 77 and 78 of the oscillating resonator 79. The resonator 79 oscillates with varying intensity analogously to the plate circuit of an ordinary heterodyne detector as the phase between the signals of loops 94 and 95 shifts, and accordingly it causes the velocity of the electrons emerging from the field between grids 77 and 78 to vary recurrently at the beat frequency. The electrode 80 is adjusted to a negative potential by battery 110 so that some of the electrons in the stream are deflected away from it while others hit it, depending upon their velocities. Two adjustments are possible, one so that almost none of the electrons of normal velocity (i. e., those passing through when neither the input nor heterodyne signals are supplied) strike the electrode, and the other so that nearly all the electrons of normal velocity strike it. In either adjustment, when a signal is added there will be electrons approaching the electrode with velocities both greater and less than the velocities without the signal. In the first adjustment those electrons of velocities greater than before will hit the electrode so that the current from electrode 80 will increase. In the second adjustment all the electrons of lowered velocity will miss the electrode while those of increased velocity will continue to hit, so the current from electrode 80 will decrease. In either case, the average current from electrode 80 will be a function of the strength of oscillation in resonator 79, as is required for signal detection. The coupling loop 96 between resonators 73 and 79 can be adjusted for such amounts of regeneration between the two circuits as may be desired. The output from electrode 80, being of frequencies in the ordinary ranges, can be amplified in ordinary vacuum tube circuits, as indicated at 113. The two grids 97 and 98 are used for modulating or interrupting the output of the detector.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An ultra-high-frequency electron discharge tube comprising means for forming and projecting a beam of electrons along a predetermined path, first and second hollow conductive resonators spaced apart and positioned in alignment along the path of said beam, each of said first and second resonators having entrance and exit grids spaced apart for defining a gap across which said electron beam passes, each of said resonators having at least one flexible wall portion, hollow drift tube means situated between said spaced resonators and surrounding said electron beam, said drift tube means joined between the exit grid of said first resonator and the entrance grid of said second resonator for maintaining a predetermined spacing therebetween, a first member rigidly coupled to said first resonator, said first member being movable in a direction substantially parallel to the path of said beam for deflecting the flexible wall portion of said first resonator and varying the spacing across the gap between the entrance and exit grids therein, a second member rigidly coupled to said second resonator, said second member being movable in a direction substantially parallel to the path of said beam for deflecting the flexible wall portion of said second resonator and varying the spacing across the gap between the entrance and exit grids therein, means including first and second separating means respectively joined to said first and second members, said separating means determining the spacing between said first and second members, and means jointly coupled to said first and second separating means for moving said separating means in different directions for varying the spacing between said first and second members, thereby varying the spacing between the entrance grid of said first resonator and the exit grid of said second resonator.

2. An ultra-high-frequency electron discharge tube comprising means for forming and projecting a beam of electrons along a predetermined path, first and second hollow conductive resonators spaced apart and positioned in alignment along the path of said beam, each of said resonators having electron permeable wall portions defining a gap across which said electron beam passes, each of said resonators having at least one flexible wall portion, hollow drift tube means situated between said spaced resonators and surrounding said path, said drift tube means being joined between a wall portion of said first resonator and a wall portion of said second resonator, a first member coupled to said first resonator for deflecting the flexible wall portion thereof and varying the spacing across the electron permeable gap therein, a second member coupled to said second resonator for deflecting the flexible wall portion thereof and varying the spacing across the electron permeable gap therein, linkage means intercoupled between said first and second members, said linkage means determining the separation between said first and second members, and means coupled to said linkage means for moving said first and second members simultaneously in substantially opposite directions for simultaneously varying the spacing across the electron permeable gaps of said first and second resonators.

3. The ultra-high-frequency electron discharge tube as defined in claim 2 wherein said first and second members are coupled respectively to the flexible wall portions of said first and second resonators opposite the wall portions joined to said drift tube means.

4. The ultra-high-frequency electron discharge tube as defined in claim 2 wherein said linkage means comprises first and second axially aligned rod means extending substantially parallel to the path of said electron beam, and wherein said means coupled to said linkage means is adapted for moving said first and second rod means in opposite directions.

5. An ultra-high-frequency electron discharge tube comprising means for forming and projecting a beam of electrons along a predetermined path, first and second hollow conductive resonators spaced apart and positioned in alignment along the path of said beam, each of said resonators having electron permeable wall portions defining a gap across which said electron beam passes, each of said resonators having at least one flexible wall portion, means surrounding said path and joined to a wall portion of said first resonator and to a wall portion of said second resonator for maintaining a predetermined separation therebetween, movable means coupled to the flexible wall portion of said first resonator for deflecting the flexible wall portion and varying the spacing across the electron permeable gap therein, said movable means being further coupled to the flexible wall portion of said second resonator for deflecting the flexible wall portion and varying the spacing across the electron permeable gap therein, and means coupled to said movable means for translating said movable means in a direction substantially parallel to the path of said beam and simultaneously varying the spacing across the electron permeable gaps of said first and second resonators.

6. The ultra-high-frequency electron discharge tube as defined in claim 5 wherein said movable means coupled to the flexible wall portions of said first and second resonators comprises a hollow drift tube means situated between said first and second resonators and surrounding said beam of electrons.

7. The ultra-high-frequency electron discharge tube as defined in claim 5 wherein said movable means coupled to the flexible wall portions of said first and second resonators comprises first and second axially aligned rod means displaced from the path of said beam and situated outside said means surrounding said beam of electrons.

References Cited in the file of this patent

UNITED STATES PATENTS

| | | |
|---|---|---|
| 2,106,768 | Southworth | Feb. 1, 1938 |
| 2,167,201 | Dallenbach | July 25, 1939 |
| 2,190,668 | Llewellyn | Feb. 20, 1940 |
| 2,242,275 | Varian | May 20, 1941 |